United States Patent
Kudo et al.

(10) Patent No.: US 11,208,245 B2
(45) Date of Patent: Dec. 28, 2021

(54) PACKAGING, BARRIER PACKAGING MATERIAL, AND PACKAGING BAG

(71) Applicant: TOPPAN PRINTING CO., LTD., Tokyo (JP)

(72) Inventors: Shigeki Kudo, Tokyo (JP); Nobuhiko Imai, Tokyo (JP); Minoru Kawasaki, Tokyo (JP); Osamu Takemoto, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 167 days.

(21) Appl. No.: 16/423,948

(22) Filed: May 28, 2019

(65) Prior Publication Data

US 2019/0283946 A1    Sep. 19, 2019

Related U.S. Application Data

(63) Continuation of application No. PCT/JP2017/043289, filed on Dec. 1, 2017.

(30) Foreign Application Priority Data

Dec. 1, 2016 (JP) .............................. JP2016-233955
Oct. 23, 2017 (JP) .............................. JP2017-204338

(51) Int. Cl.
    *B65D 65/40*    (2006.01)
    *B32B 7/12*    (2006.01)
    (Continued)

(52) U.S. Cl.
    CPC ................ *B65D 65/40* (2013.01); *B32B 7/12* (2013.01); *B32B 27/00* (2013.01); *B32B 27/08* (2013.01);
    (Continued)

(58) Field of Classification Search
    CPC ........... B65D 65/40; B32B 7/12; B32B 27/08; B32B 27/20; B32B 27/32; B32B 27/00;
    (Continued)

(56) References Cited

U.S. PATENT DOCUMENTS

2013/0046061 A1* 2/2013 Hermel-Davidock ......................
C08L 23/08
525/240

FOREIGN PATENT DOCUMENTS

JP    B-63-028017    6/1988
JP    A-08-277335    10/1996
(Continued)

OTHER PUBLICATIONS

JP2012-081615, English machine translation, Apr. 26, 2012.*
(Continued)

*Primary Examiner* — Michael C Miggins (57) ABSTRACT

A packaging is provided including: a base layer including at least one layer of a biaxially oriented resin film; and a sealant layer including at least a first thermoplastic resin layer and a second thermoplastic resin layer, in which the base layer, the first thermoplastic resin laser, and the second thermoplastic resin layer are laminated in this order, a density of a first resin forming the first thermoplastic resin layer is higher than a density of a second resin forming the second thermoplastic resin layer, the density of the first resin is 0.90 g/cm³ or higher, the density of the second resin is 0.92 g/cm³ or lower, and the second thermoplastic resin layer contains 200 to 2000 ppm of a lubricant including at least one of a fatly acid amide lubricant and a fatty acid ester lubricant.

18 Claims, 2 Drawing Sheets

(51) Int. Cl.
  *B32B 27/08* (2006.01)
  *B32B 27/20* (2006.01)
  *B32B 27/32* (2006.01)
  *B32B 27/00* (2006.01)
  *B32B 27/18* (2006.01)

(52) U.S. Cl.
  CPC .............. *B32B 27/18* (2013.01); *B32B 27/20* (2013.01); *B32B 27/32* (2013.01); *B32B 2255/10* (2013.01); *B32B 2255/20* (2013.01); *B32B 2307/412* (2013.01); *B32B 2307/7246* (2013.01); *B32B 2439/46* (2013.01)

(58) Field of Classification Search
  CPC .............. B32B 27/18; B32B 2255/10; B32B 2255/20; B32B 2307/412; B32B 2307/7246; B32B 2439/46
  See application file for complete search history.

(56) References Cited

FOREIGN PATENT DOCUMENTS

| | | |
|---|---|---|
| JP | A-10-034804 | 2/1998 |
| JP | A-2001-270026 | 10/2001 |
| JP | A-2008-302977 | 12/2008 |
| JP | B-4730061 | 7/2011 |
| JP | A-2012-081615 | 4/2012 |
| JP | A-2013-035560 | 2/2013 |

OTHER PUBLICATIONS

JP2006-341887, English machine translation, Dec. 21, 2006.*
International Search Report dated Feb. 27, 2018 in corresponding International Patent Application No. PCT/JP2017/043289.
Written Opinion of the International Searching Authority dated Feb. 27, 2018 in corresponding International Application No. PCT/JP2017/043289.

* cited by examiner

PACKAGING, BARRIER PACKAGING MATERIAL, AND PACKAGING BAG

CROSS-REFERENCE TO RELATED APPLICATIONS

The present application is a continuation application of International Application No. PCT/JP2017/043289, filed Dec. 1, 2017, which claims priority to Japanese Patent Application No. 2016-233955, filed Dec. 1, 2016 and Japanese Patent Application No. 2017-204338, filed Oct. 23, 2017. The contents of these applications are incorporated herein by reference in their entirety.

BACKGROUND OF THE INVENTION

Field of the Invention

The present invention relates to packaging that contains food, toiletry items, medicines, or the like, and packaging used as a packaging bag to be filled with a liquid, and relates to packaging and barrier packaging which enable a small packaging bag to be filled with liquid food including seasonings, drinks, and permeable or volatile substances, foods such as paste-like food, or nonfood liquids such as shampoo and cold insulation at a high speed, can be filled under high temperature conditions caused by heat sterilization treatments or the like at a high speed, and can be manufactured efficiently with stable quality, and a packaging bag using these.

Priority is claimed on Japanese Patent Application No. 2016-233955, filed Dec. 1, 2016 and Japanese Patent Application No. 2017-204338, filed Oct. 23, 2017, the contents of which are incorporated herein by reference.

Description of the Related Art

As a thermoplastic resin layer of packaging for high-speed tilling of liquids, a low-density low-temperature heat sealable resin is generally used. In particular, linear low-density polyethylene (hereinafter, referred to as LLDPE) is used from the viewpoints of impact resistance, hot sealing properties, and the like. A thermoplastics resin suitable for the high-speed filling is a material having a low melting temperature and a small heat quantity of melting. The melting temperature or the heat quantity of melting of polyethylene varies mainly depending on density. There is a tendency that the lower the density, the lower the melting temperature and the smaller the heat quantity of melting.

PTL 1 discloses a low-temperature heat sealable polyethylene resin laminated film. In the laminated film, two layers of polyethylene resin layers of a laminate layer and a sealing layer are laminated and an average density is specified such that a density of the laminate layer is higher than that of the sealing layer. In addition, a laminated film which is provided with a polyethylene resin layer having an intermediate density, as an intermediate layer, is also exemplified. The laminated film is particularly excellent in flexibility, low-temperature heat sealability, blocking resistance, bursting resistance, and the like, which are required for a packaging bag for a low-temperature heavy load.

On the other hand, in foods such as seasonings, hot filling method, in which filling is performed in a state of being heated to approximately 70° C. to 95° C. and sterilized, is adopted. Therefore, in a case where the thermoplastic resin layer has a low melting temperature a small heat quantity of melting, depending on a content with which filling is performed, the thermoplastic resin layer melts. Accordingly, there is a possibility that the thermoplastic resin layers facing each other may fuse together in an inner surface of the packaging bag and a filling failure may occur.

In response to such a problem, PTL 2 discloses a packaging film which has heat resistance to withstand high-temperature filling in automatic filling packaging and is excellent also in heat sealing properties. The packaging film is a film in which an intermediate layer and a sealant layer which are formed of LLDPE are provided on a substrate by extrusion and a density of the intermediate layer is made higher than a density of the sealant layer.

However, the low-temperature heat sealable polyethylene resin laminated film disclosed in PTL 1 is excellent in heat sealing property at a low temperature, but was difficult to be applied for applications such as a case in which a content such as food was heat sterilized and then filling was performed at high temperature as it was.

In addition, in a case where the intermediate layer and the sealant layer are formed of LLDPE as in the packaging film disclosed in PTL 2, during production by extrusion, since the LLDPE has a low melt tension and tends to cause neck-in (a phenomenon that a width of the resin extruded from a die becomes narrower than an opening width of the die) and edge rocking (a phenomenon that a width of extruded resin fluctuates), there was a problem in that the yield deteriorates.

In addition, in the related art, as a gas barrier packaging material for containing foods, toiletries such as cleansers, medicines, or the like, for example, a packaging material is known in which a sealant film formed of linear low-density polyethylene resin is laminated on a polyethylene terephthalate film coated with polyvinylidene chloride resin, via a dry lamination adhesive.

However, in the packaging material having this configuration, polyvinylidene chloride used for a barrier layer is avoided, from the viewpoint of environmental problems related to waste, such as the generation of harmful gas such as chlorine gas or dioxin in an incineration treatment after use.

There is also a packaging material in which an aluminum foil is laminated instead of the polyvinylidene chloride, as a packaging material having no such problem of harmful gas generation. However, since the packaging material is not transparent, the content may not be visible. Also, the same environmental problems related to waste as the polyvinylidene chloride are present, such as a problem in that aluminum residue damages an incinerator in the incineration treatment of waste after use or incineration ash generates harmful gas at a landfill disposal site. Accordingly, such packaging is also avoided.

Thus, a film obtained by depositing an inorganic oxide such as a silicon oxide or an aluminum oxide on a polyethylene terephthalate film or a stretched nylon film instead of these gas barrier layers is widely used as a transparent gas barrier film (for example. PTL 3).

In addition, as an example of a packaging material using the gas barrier film, there is a transparent gas barrier packaging material in which a sealant film formed of a linear low-density polyethylene resin is laminated on a deposition surface of a polyethylene terephthalate film on which silicon oxide is deposited, via an adhesive layer formed of a dry lamination adhesive (for example, PTL 4).

However, in the gas barrier packaging material of the related art, as shown in PTLs 3 and 4, particularly in a gas barrier packaging material that packages contents such as liquids, paste-like foods, and toiletries, which contain a permeable, volatile, or oil substance, there are problems in that the adhesion strength between the gas barrier film and the sealant film deteriorated over time and bursting occurred or tearability deteriorated.

CITATION LIST

Patent Literature

[PTL 1] Japanese Patent No. 4730061
[PTL 2] Japanese Unexamined Patent Application, First Publication No. 2008-302977
[PTL 3] Japanese Examined Patent Application, Second Publication No. S63-28017
[PTL 4] Japanese Unexamined Patent Application, First Publication No. H10-34804

BRIEF SUMMARY OF THE INVENTION

Technical Problem

The present invention has been made in view of the problems of the related art as shown in PTLs 1 and 2, and a first object thereof is to provide packaging which enables filling to be efficiently performed by an auto filler at a high speed without a filling failure even in a case of the content requiring hot filling and is also desirable in manufacturing efficiency.

The present invention solves the problems of the related art as shown in PTLs 3 and 4, and a second object thereof is to provide transparent barrier packaging having no environmental problems related to waste and no deterioration in adhesion strength over time and a packaging bag desirable in bag bursting strength and/or tearability using the barrier packaging.

Solution to Problem (1) In order to solve the problems, according to a first aspect of the present invention, there is provided packaging including: a base layer including at least one layer of a biaxially oriented resin film; and a sealant layer including at least a first thermoplastic resin layer and a second thermoplastic resin layer, in which the base layer, the first thermoplastic resin layer, and the second thermoplastic resin layer are laminated in this order, a density of a first resin forming the first thermoplastic resin layer is higher than a density of a second resin forming the second thermoplastic resin layer, the density of the first resin is 0.90 g/cm$^3$ or higher, the density of the second resin is 0.92 g/cm$^3$ or lower, and the second thermoplastic resin layer contains 200 to 2000 ppm of a lubricant including at least one of a fatty acid amide lubricant and a fatty acid ester lubricant.

(2) At least one of the first thermoplastic resin layer and the second thermoplastic resin layer may be formed of a polyolefin resin.

(3) At least one of the first thermoplastic resin layer and the second thermoplastic resin layer may contain at least one kind of linear low-density polyethylene.

(4) At least one of the first thermoplastic resin layer and the second thermoplastic resin layer may contain a mixture of at least one kind of linear low-density polyethylene and low-density polyethylene.

(5) A blending ratio of the low-density polyethylene to the linear low-density polyethylene may be 40% or less in terms of weight ratio.

(6) The base layer may be provided with a barrier layer against at least one of water vapor and gas.

(7) The barrier layer may include a deposition layer formed of at least an inorganic oxide, a transparent ink layer may be provided on the barrier layer, an adhesive layer may be provided on the transparent ink layer, a sealant layer may be provided on the adhesive layer, and the transparent ink layer may be formed of a transparent ink containing a binder resin formed of a mixture of a urethane resin and a vinyl chloride-vinyl acetate copolymer resin.

(8) A transparent pigment may be dispersed in the binder resin.

(9) The transparent pigment may be a compound selected from the group consisting of precipitated barium sulfate, calcium carbonate, silica, and a mixture thereof.

(10) A content rate of the transparent pigment in the transparent ink layer may be 1% by weight or more and 20% by weight or less.

(11) A mixing ratio in the binder resin may be set such that the vinyl chloride-vinyl acetate copolymer resin is 1 part by weight to 5 parts by weight with respect to 10 parts by weight of the urethane resin.

(12) A colored ink layer may be provided at least in a part between the deposition layer and the transparent ink layer.

(13) According to a second aspect of the present invention, there is provided a packaging bag including the packaging according to the above described aspect.

(14) According to a third aspect of the present invention, there is provided a transparent barrier packaging material, including: a base film; a deposition layer provided on the base film and formed of at least an inorganic oxide; a transparent ink layer provided on the deposition layer and formed of a transparent ink containing a binder resin formed of a mixture of a urethane resin and a vinyl chloride-vinyl acetate copolymer resin; an adhesive layer provided on the transparent ink layer; and a sealant layer provided on the adhesive layer.

Advantageous Effects of Invention

According to the packaging described in (1) according to the aspect of the present invention, it is possible to obtain packaging in which while having a low-temperature sealability, a sealing layer does not adhere to a site other than a sealing portion even when performing hot-filling in which filling is performed with a content at a high temperature as it is, filling can be efficiently performed in an automatic filling device, meandering or wrinkles do not occur in a manufacturing step or filling step of the packaging, and it can be efficiently manufactured with stable quality.

According to the packaging described in (2) according to the aspect of the present invention, it is possible to obtain packaging having good heat resistance and heat According to the packaging described in (3) according to the aspect of the present invention, it is possible to obtain packaging having better heat resistance and heat sealability.

According to the packaging described in (4) according to the aspect of the present invention, it is possible to obtain packaging in which there is less neck-in or edge rocking in a manufacturing step of the packaging and a manufacturing efficiency thereof is further enhanced.

According to the packaging described in (5) according to the aspect of the present invention, it is possible to obtain packaging which can efficiently be manufactured with less occurrence of neck-in and edge rocking in a manufacturing step of the packaging and also has good heat sealability.

According to the packaging described in (6) according to the aspect of the present invention, it is possible to obtain packaging having high protective performance of a content.

According to (7) to (14) according to the aspect of the present invention, it is possible to provide packaging and barrier packaging having no environmental problems related to waste and no deterioration in adhesion strength over time, and a packaging bag excellent in bag bursting strength or tearability using the packaging and the barrier packaging.

Therefore, according to the packaging and the barrier packaging materials of (7) to (14) according to the aspect of the present invention, particularly as a transparent barrier packaging bag that contains foods (such as condiments and seasonings) containing permeable or volatile substances, toiletries such as cleansers, liquids such as cosmetics, and paste contents, and as a packaging bag having no environmental problems related to waste, it is possible to exhibit an excellent effect in practical use.

More specifically, according to the packaging described in (8) according to the aspect, the transparent ink layer, which is formed of a mixture including a urethane resin, a vinyl chloride-vinyl acetate copolymer resin, and a transparent pigment and is excellent in adhesion, is provided on a surface of the deposition layer of a ceramic deposition film. Accordingly, it is possible to obtain barrier packaging in which adhesion between the surface of the deposition layer and the adhesive layer is good and tearability is also good without deterioration in adhesion strength over time.

According to the packaging of (9) or (10) according to the aspect, it is possible to provide a transparent ink layer having excellent transparency, adhesion, tearability, and printability.

According to the packaging described in (11) according to the aspect, a mixing ratio in the binder resin is set such that the vinyl chloride-vinyl acetate copolymer resin is 1 part by weight to 5 parts by weight with respect to 10 parts by weight of the urethane resin. Accordingly, it is possible to provide a transparent ink layer having excellent adhesion, tearability, and blocking resistance.

According to the packaging described in (12) according to the aspect, the colored ink layer is provided on a part or the entire (at least in a part) between the surface of the deposition layer of the ceramic deposition film and the transparent ink layer. Accordingly, it is possible to obtain barrier packaging to which an advertisement or design effect or a content concealing effect is imparted.

According to the packaging bag described in (13) according to the aspect, the packaging bag is formed by using the barrier packaging no deterioration in adhesion strength over time. Accordingly, it is possible to obtain a barrier packaging bag (transparent barrier packaging bag) having excellent bursting strength and excellent tearability.

DETAILED DESCRIPTION OF THE INVENTION

Hereinafter, embodiments of the present invention will be described in detail. The present invention is not to be interpreted as being limited to the following embodiments.

Figure 1:
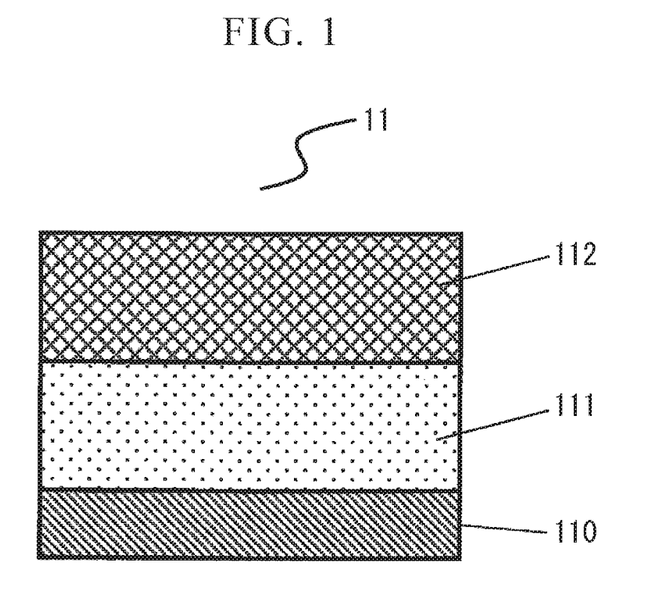
FIG. 1 is a schematic sectional view showing a configuration of packaging according to a first embodiment of the present invention.

FIG. 1 is a schematic sectional view (schematic configuration view) showing packaging 11 according to a first embodiment of the present invention. The packaging 11 in the present embodiment includes a sealant layer including at least a first thermoplastic resin layer 111 and a second thermoplastic resin layer 112, on a base layer 110 including at least one layer of a biaxially oriented resin film. In addition, in the packaging 11 according to the present embodiment, the first thermoplastic resin layer 111 is provided on the base layer 110, the second thermoplastic resin layer 112 is provided on the first thermoplastic resin layer 111, a density of the first thermoplastic resin layer 111 is set higher than a density of the thermoplastic resin layer 112.

In a case where the packaging 11 according to the present embodiment is loaded in an auto filler that performs filling and sealing of a content while manufacturing the packaging and filling and sealing of the content are performed, when an opening is heat sealed with a seal bar after the filling, the second thermoplastic resin layer 112 (the second thermoplastic resin layers on one side) adheres to the second thermoplastic resin layer 112 (second thermoplastic resin layer on the other side) facing as a sealing layer. Therefore, in order to perform high-speed filling, it is appropriate to select a resin that melts with as little heat quantity as possible. However, in a case of performing hot filling in which filling is performed with a content at a high temperature as it is, thermoplastic resin melts to have fluidity due to the heat of the content, and there is a possibility that the second thermoplastic resin layers 112 may fuse with each other at a site other than a portion to be originally sealed and a filling failure may occur.

Thus, when providing a first thermoplastic resin layer 111 having a heat quantity of melting higher than that of the second thermoplastic resin layer 112 between the base layer 110 and the second thermoplastic resin layer 112 which is a sealing layer, as an intermediate layer, flow of the thermoplastic resin layer can be suppressed. In other words, when using the second thermoplastic resin layer 112 and the first thermoplastic resin layer 111 having a heat quantity of melting higher than that of the second thermoplastic resin layer 112, as the sealant layer, flow of the thermoplastic resin layer on the base layer 110 can be suppressed.

In general, the heat quantity of melting of the resin increases as the density of the resin increases. Therefore, as the resin used as the intermediate layer (first thermoplastic resin layer in the present embodiment), a thermoplastic resin having a density higher than that of the resin used as the sealing layer (second thermoplastic resin layer in the present embodiment) may be selected. Here, a thickness of the first thermoplastic resin layer 111 is preferably 10 µm to 40 µm in consideration of the flow suppression effect at the time of high temperature filling. In addition, a thickness of the second thermoplastic resin layer 112 is preferably 10 µm to 40 µm. When the thickness is less than 10 µm, a sufficient sealing strength cannot be obtained, and when exceeding 40 µm, the high-speed sealability is impaired.

Examples of the thermoplastics resin used for the first thermoplastic resin layer 111 and the second thermoplastic resin layer 112 in the packaging 11 according to the present embodiment include a polyolefin resin formed of polyolefin such as polyethylene. Among them, as a thermoplastics resin used for the first thermoplastic resin layer 111 and second thermoplastic resin layer 112 in the packaging 11 according to the present embodiment, linear low-density polyethylene (LLDPE) is preferably used in view of characteristics such as heat resistance and hot sealability. Regarding the density of the resin in the present embodiment, one resin having a target density may be selected, or a plurality of resins may be mixed to adjust an average density of a resin layer in accordance with a target density. The LLDPE in the present embodiment also includes those which have been marketed under the name of linear ultra low-density polyethylene having a lower density than the range specified by the Japanese Industrial Standards.

The packaging 11 according to the present embodiment can be manufactured by a known melt extrusion forming method and can be suitably manufactured by a co-extrusion method using a T die or an extrusion lamination method. However, in this case, when the LLDPE is used alone as a thermoplastics resin, a defect such as neck-in or edge rocking may occur due to insufficient melt tension at the time of extrusion, in some cases. Since these defects cause reduction in thickness unevenness and effective width of an extruded resin, the yield may be lowered in some cases. This problem can be solved by adding low-density polyethylene (hereinafter referred to as LDPE) and increasing the melt tension. The amount of the LDPE to be added is preferably 40% or less with respect to the LLDPE, in terms of weight ratio. When the amount exceeds 40%, characteristics such as heat sealability, which is a characteristic of the LLDPE, remarkably deteriorate.

The density of the first thermoplastic resin layer 111 (a density of a first resin forming the first thermoplastic resin layer) is preferably 0.90 g/cm$^3$ or higher. When the density of the first thermoplastic resin layer 111 is lower than 0.90 g/cm$^3$, the melting point becomes too low, the thermoplastic resin layer becomes more likely to flow at the time of hot filling, and fusion is likely to occur. Therefore, it is inconvenient in terms of hot filling suitability.

In addition, the density of the second thermoplastic resin layer 112 (the density of a second resin forming the second thermoplastic resin layer) is desirably lower than the density of the first thermoplastic resin layer 111 and 0.92 g/cm$^3$ or lower and is preferably lower than 0.92 g/cm$^3$. When the density of the second thermoplastic resin layer 112 is higher than 0.92 g/cm$^3$, the heat quantity of fusion becomes too large. Therefore, it becomes unsuitable in terms of high-speed filling suitability. When a plurality of resins are mixed to form each resin layer, it is favorable that an average density of the mixed resins satisfies these conditions.

In general, a low-density type of thermoplastics resin is desirable in low-temperature sealability and high speed filling sealability, but has a defect in poor lubricity. When the lubricity of the resin is poor, a defect in that wrinkles occur in winding when the thermoplastic resin layer is formed by extrusion processing, meandering or wrinkles occur in conveyance in a high speed auto filler, or the like is induced. Therefore, it is preferable to add 200 to 2000 ppm of a lubricant such as a fatty acid amide lubricant or a fatty acid ester lubricant to the resin of the second thermoplastic resin layer 112 which is the sealing layer. The lubricant to be added to the second thermoplastic resin layer 112 cannot provide sufficient lubricity at less than 200 ppm, and when added to the second thermoplastic resin layer 112 by more than 2000 ppm, sealability deteriorates.

Examples of the fatty acid amide lubricant include stearic acid amide, oleic acid amide, and erucic acid amide.

Examples of the fatty acid ester lubricant include stearic acid monoglyceride and stearyl stearate.

As a technique other than the addition of a lubricant, a technique of adding an inorganic spherical filler is proposed. However, when surface roughness of the sealing layer increases by the filler, there is a high possibility that a liquid may be caught at the time of high-speed filling, that is, contaminated seal may be caused. Therefore, the lubricant is desirably used.

The biaxially oriented resin film of the base layer 110 is not particularly limited as long as it has sufficient mechanical strength and heat resistance. For example, a film obtained by biaxially stretching polyester such as polyethylene terephthalate, polyethylene naphthalate, and polybutylene terephthalate, polyamide such as nylon, polypropylene, polystyrene, polyimide, polyvinyl alcohol, polyvinyl chloride, ethylene-vinyl alcohol copolymer, or the like, a composite film obtained by laminating two or more of the films, and the like can be used. In addition, a non-oriented film may be laminated on the biaxially oriented film.

In addition, when a barrier layer such as an aluminum foil, a metal deposition layer, or a transparent deposition layer of an inorganic oxide (deposition layer of an inorganic oxide) is provided on the base layer 110, preservability of a content can be enhanced. Among these, it is preferable to provide the transparent deposition layer, because visibility of a content can be secured and foreign matter contamination inspection by a metal detector becomes possible.

In addition, depending on the application, a printing layer, a concealing layer, and the like may also be provided. In addition, an anchor coat or an adhesive layer for improving adhesion between the base layer 110 and the first thermoplastic resin layer 111 may also be provided.

For example, as in the packaging according to a second embodiment to be described later, the packaging 11 may be configured such that a deposition film of an inorganic oxide, an adhesive layer, a sealant layer including the first thermoplastic resin layer 111 and the second thermoplastic resin layer 112 are laminated on the base layer 110 in this order, and may be configured such that an anchor coat layer, a deposition film of an inorganic oxide, a coating layer, an adhesive layer, the sealant layer including the first thermoplastic resin layer 111 and the second thermoplastic resin layer 112 are laminated on the base layer 110 in this order. In addition, the packaging 11 may also be configured such that a deposition film of an inorganic oxide, a colored ink layer, an adhesive layer, and the sealant layer including the first thermoplastic resin layer 111 and the second thermoplastic resin layer 112 are laminated on the base layer 110 in this order.

Examples of an application of the packaging according to the present embodiment include packaging for liquid packaging in which a content is liquid.

Hereinafter, the second embodiment of the present invention will he described in detail, with reference to the drawings.

Figure 2:
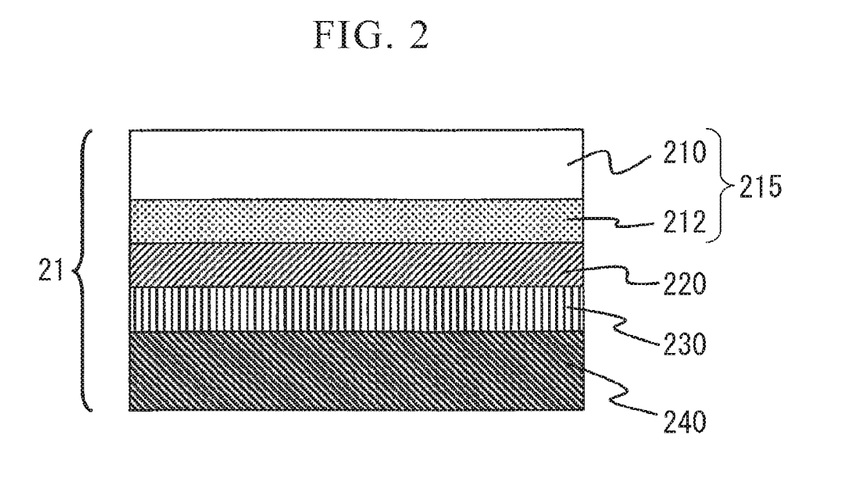
FIG. 2 is a schematic sectional view showing a lamination structure of barrier packaging according to a second embodiment of the present invention.

For example, as shown in the schematic sectional view of FIG. 2, the barrier packaging according to the second embodiment of the present invention is packaging 21 (barrier packaging or transparent barrier packaging) having a configuration in which a transparent ink layer 220 formed of a urethane resin or the like is laminated on a surface of a deposition layer 212 of a ceramic deposition film 215 in which, as a barrier layer (first barrier layer), the deposition layer 212 formed of an inorganic oxide is provided on a base layer 210 (base film) such as a polyethylene terephthalate film, an adhesive layer 230 such as an adhesive for dry lamination is applied on the transparent ink layer 220, and a sealant layer 240 such as linear low-density polyethylene is laminated thereon.

In addition, the barrier layer provided on the base layer 210 may include at least the deposition layer 212 formed of an inorganic oxide as a first barrier layer. A configuration, in which as a second barrier layer, a coating layer is provided on the deposition layer 212 and the transparent ink layer 220 is provided on the coating layer, may be adopted.

As the coating layer, the same layer as a coating layer 213 shown in a first modification example of the second embodiment of the present invention to be described later can be used.

As the adhesive layer 230, a layer formed of an anchor coating agent instead of the adhesive may be used, and melted linear low-density polyethylene or the like can be extruded and laminated on the layer formed of the anchor coating agent to form a sealant layer 240.

Figure 3:
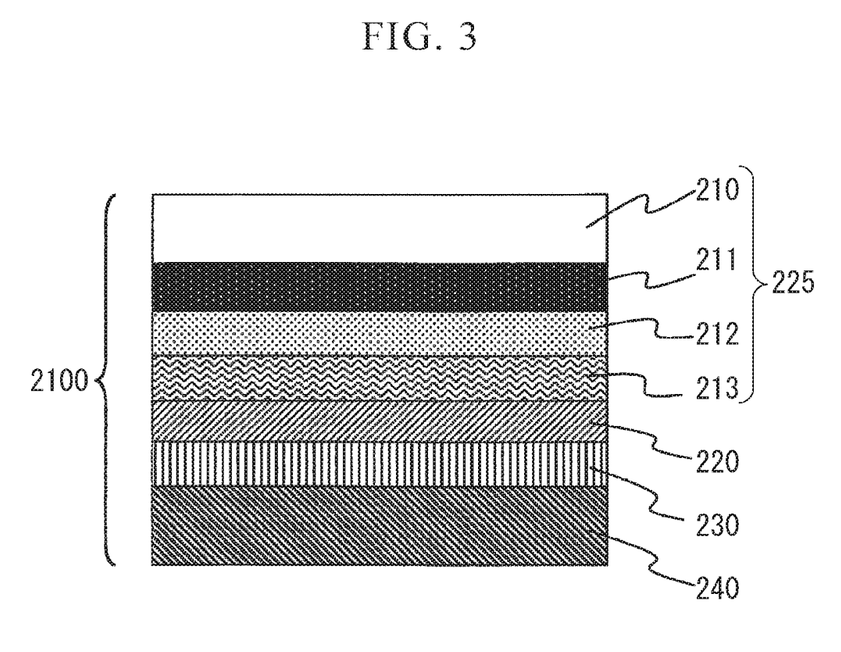
FIG. 3 is a schematic sectional view showing a lamination structure of the barrier packaging in a first modification example according to the second embodiment of the present invention.

In addition, as the first modification example in the second embodiment of the present invention, as shown in the schematic sectional view of FIG. 3, in barrier packaging 2100, an anchor coat layer 211 is formed on a base layer 210 formed of a polyethylene terephthalate film or the like, and as a first barrier layer, a deposition layer 212 formed of an inorganic oxide is provided on the anchor coat layer 211. Further, a ceramic deposition film 225 having a lamination structure in which as a second barrier layer, a coating layer 213 is provided on the deposition layer 212 is formed to prevent cracking due to kneading or the like from occurring in the deposition layer 212. Further, the transparent ink layer 220 formed of urethane resin or the like is formed on the surface of the coating layer 213. In addition, the packaging is configured by applying the adhesive layer 230 formed of an adhesive for dry lamination or the like onto the transparent ink layer (220) and laminating the sealant layer 240 such as linear low-density polyethylene on the adhesive layer 230.

Also, as the adhesive layer 230, a layer formed of an anchor coating agent instead of the adhesive may be used, and melted linear low-density polyethylene or the like can be extruded and laminated on the layer formed of the anchor coating agent to form a sealant layer 240. In addition, a configuration in which the coating layer 213 is removed from the lamination structure can be adopted.

Figure 4:
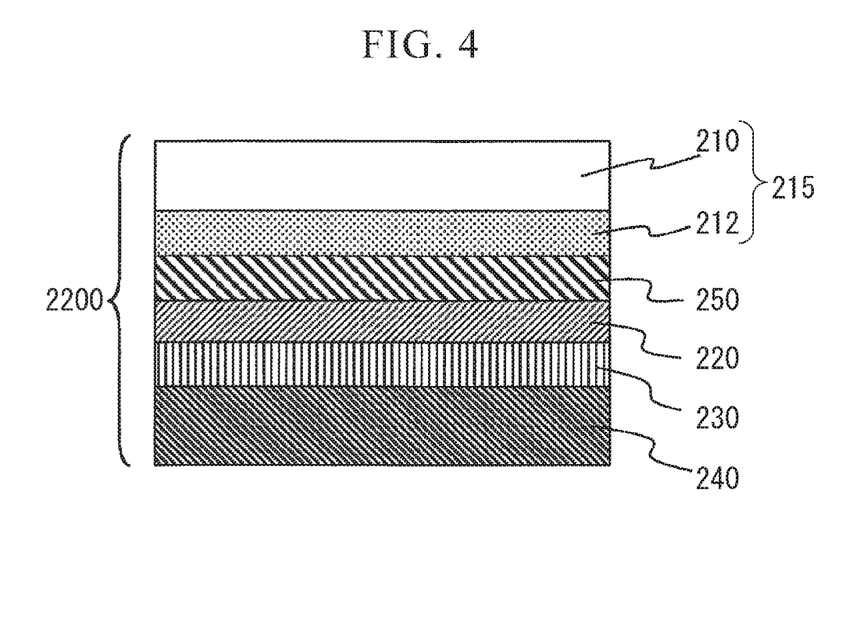
FIG. 4 is a schematic sectional view showing a lamination structure of the barrier packaging in a second modification example according to the second embodiment of the present invention.

In addition, as a second modification example in the second embodiment of the present invention, as shown in the schematic sectional view of FIG. 4, barrier packaging 2200 is barrier packaging in which a colored ink layer 250 is provided between the surface of the deposition layer 212 of the ceramic deposition film 215 and the transparent ink layer 220 to impart an advertisement or design effect or content concealing effect thereto.

The colored ink layer 250 may be provided on the entire (entire surface) between the deposition layer 212 and the transparent ink layer 220, or may be provided on part (part of the surface). In addition, the colored ink layer 250 may be provided as a printed pattern by a printing method.

Hereinafter, materials, manufacturing methods, and the like, by which the barrier packaging according to the present embodiment is manufactured, will be described in detail.

First, examples of the base layer 210 of the ceramic deposition films 215 and 225 shown in FIGS. 2 to 4 include a polyethylene terephthalate film, a stretched nylon film, or a biaxially oriented polypropylene film, which has a thickness of approximately 10 to 20 μm. It is possible to be selected appropriately according to a content or an application.

Further, as the deposition layer 212 of the inorganic oxide constituting the ceramic deposition films 215 and 225 shown in FIGS. 2 to 4, for example, a silicon oxide such as $SiO_2$ and SiO, an aluminum oxide such as $Al_2O_3$, and the like are preferable. For example, when using a physical vapor deposition method or a chemical vapor deposition method as a lamination method of the deposition layer 212, it is possible to form a barrier film that is transparent and has excellent gas barrier property.

In addition, as the anchor coat layer 211 configuring the ceramic deposition film 225 shown in FIG. 3, for example, a composition including at least acrylic polyol an isocyanate compound, and tri-functional organosilane represented by general formula: $R'Si(OR)_3$ (in the formula, R' represents one kind of an alkyl group, a vinyl group, and a glycidoxy-propyl group, R is an alkyl group) or hydrolyzate of organosilane, or a composition obtained by adding metal alkoxide represented by general formula: $M(OR)_n$ (in the formula, M is a metal element, R is an alkyl group such as $CH_3$ and $C_2H_5$, and n is the oxidation number of a metal element) or a hydrolyzate of a metal alkoxide to the above composition can be used.

In addition, as the coating layer 213 configuring the ceramic deposition film 225 shown in FIG. 3, for example, a coating layer formed of a coating agent, obtained by using an aqueous solution containing a water-soluble polymer and at least one of (a) one or more kind of metal alkoxide and a hydrolyzate thereof and (b) tin chloride or a water-alcohol mixed liquid as a main component, can be used. When the deposition layer 212 is covered so as to be sandwiched between the anchor coat layer 211 and the coating layer 213, it is possible to prevent cracking or the like, which can be caused by kneading or the like of the deposition layer 212, from occurring.

In addition, for the transparent ink layer 220 configuring the barrier packagings 21, 2100, and 2200 according to the present embodiment, a transparent ink including a binder resin formed of a mixture of a urethane resin and a vinyl chloride-vinyl acetate copolymer resin may be used, and it is suitable to use a transparent ink in which a transparent pigment is dispersed in a binder resin formed of a urethane resin and a vinyl chloride-vinyl acetate copolymer resin.

In general, the higher the hardness of a binder resin, the better the tearability of a coating film itself. However, the lower the hardness and the higher the flexibility, the better the adhesion. In the configuration of barrier packaging of the related art, in a case where the adhesion between the ceramic deposition film and the sealant layer is low, elongation peeling of the sealant layer occurs at the time of tearing to open the packaging, and there is a problem that the tearability remarkably decreases.

On the other hand, according to the barrier packaging according to the present embodiment, it is possible to obtain barrier packaging including a transparent ink layer 220 in which adhesion and tearability are compatible with each other by using a binder resin of which hardness is controlled to obtain sufficient adhesion and increasing the hardness of a bulk of the ink layers by dispersing the transparent pigment.

When a compound selected from the group consisting of precipitated barium sulfate, calcium carbonate, silica, and a mixture thereof is used as the transparent pigment. It is possible to obtain the transparent ink layer 220 which is desirable in transparency. In addition, a content rate of the transparent pigment in the transparent ink layer 220 is appropriately 1% by weight or more and 20% by weight or less. When the content rate of the transparent pigment is less than 1% by weight, the effect of improving the tearability by adding the transparent pigment cannot be sufficiently obtained. In addition, when the content rate of the transparent pigment is more than 20% by weight, coating becomes difficult due to a decrease in fluidity.

A mixing ratio in the binder resin is appropriately set such that the vinyl chloride-vinyl acetate copolymer resin is from 1 part by weight to 5 parts by weight with respect to 10 parts by weight of the urethane resin. In a case where the mixing ratio of vinyl chloride-vinyl acetate copolymer resin is less than 1 part by weight, there is a concern of deterioration of the tearability of the binder resin itself or blocking of the ink layer. When the mixing ratio of the vinyl chloride-vinyl acetate copolymer resin is more than 5 parts by weight, the hardness of binder resin is too high, therefore, there is a concern that the adhesion may decrease.

When these binder resins are dissolved in an appropriate solvent, the transparent pigment is dispersed in this hinder solution as needed, and coating is performed so as to have a thickness of 0.05 to 5.0 μm, more preferably 0.5 to 3.0 μm by a gravure method, a roll coating method, or the like, it is possible to obtain a transparent ink layer which is excellent in transparency, adhesion, tearability, and printability.

The transparent ink layer 220 may be a one-component curing type of the above composition or a two-component curing type. However, in a case of the two-component curing type, it is desirable to use polyisocyanate as a curing agent. Specific examples thereof include aromatic polyisocyanate such as tolylene diisocyanate (TDI), diphenylmethane diisocyanate (pure MDI), polymethylene polyphenylene polyisocyanate (polymeric MDI), tolidine diisocyanate (TODI), and naphthalene diisocyanate (NDI) or aliphatic polyisocyanate such as hexamethylene diisocyanate (HDI), isophorone diisocyanate (IPDI), xylene diisocyanate (XDI), and dicyclohexylmethane diisocyanate (hydrogenated MDI). In particular, in a case where a content is food, the latter aliphatic polyisocyanate is suitably used.

In addition, in order to impart other functionality to the transparent ink layer 220, additives may be included in the resins. For example, natural wax (such as wax), synthetic wax (such as polyethylene wax and fatty acid amide) can be used for the purpose of improving friction resistance, blocking prevention, slipping property, coloring property aid, fluidity, improving heat resistance, antistatic property, printability, or the like. In addition to this, dispersants, antistatic agents, surface modifications, and the like can be exemplified, and these can be appropriately selected and used.

In addition, the sealant layer 240 which is the innermost layer shown in FIGS. 2 to 4 is obtained by, for example, laminating a linear low-density polyethylene film, a low-density polyethylene film, a high-density polyethylene film, an unoriented polypropylene film, or the like Which has a thickness of approximately 40 μm through an dry lamination adhesive, or extruding and laminating a melted linear low-density polyethylene resin, a low-density polyethylene resin, a high-density polyethylene resin through an anchor coating agent.

In the present embodiment, in particular, as the sealant layer 240 which is the innermost layer in a case where the content is a liquid material or a paste-like material, the linear low-density polyethylene polymerized by using a metallocene catalyst, in which it is possible to perform high speed filling and cope with contaminated seal, is suitably used, since it is desirable in low-temperature heat sealability, and blocking resistance. When selecting the linear low-density polyethylene manufactured by using the metallocene catalyst as the sealant layer, it is possible to obtain barrier packaging having good low-temperature heat sealability and blocking resistance. In particular, in a case where the content is a liquid material or a paste-like material, barrier packaging, in which it is possible to perform high-speed filling of filling machine, that performs filling with the content and seals an opening, and cope with contaminated seal, can be obtained.

In addition, the sealant layer 240 may be formed of multilayers having different sealability between a core layer and the sealing layer, that is, layers of coextrusion or tandem extrusion.

For example, in a case where the sealant layer 240 is formed of multilayers, a sealant layer formed of the first thermoplastic resin layer 111 and the second thermoplastic resin layer 112 as shown in the first embodiment may be used.

In a case where the sealant layer 240 according to the present embodiment is formed of the first thermoplastic resin layer 111 and the second thermoplastic resin layer 112 according to the first embodiment, when filling the packaging with a content, it is possible to perform high-speed filling (high-speed filling property is good), which is particularly preferable.

EXAMPLES

Hereinafter, the present invention will be described in detail, using Examples. However, the present invention is not limited to the following Examples. Packaging of each Example was evaluated based on the following methods and criteria.

1) Extrusion Processing Suitability

A width of a resin right under a die of an extruder and a width of a resin 100 mm below the die were measured, and the neck-in was calculated from the difference.

2) Lubricity

The dynamic friction coefficient on a second thermoplastic resin layer side was measured in accordance with Japanese Industrial Standard K 7125: 1999.

3) High-Speed Filling Suitability

Filling was performed while forming a bag in a three-sided flat pouch shape having a width of 80 mm and a pitch of 90 mm, by using an auto filler DANGAN type 3 (manufactured by Taisei Lamick Co., Ltd.). A test was performed by varying a packaging conveying speed as 10 m/min and 20 m/min in two ways, and a temperature of a seal bar as 120° C., 150° C. and 180° C. in three ways. In addition, the content was 25 g of water per bag, and room temperature filling at 25° C. and hot filling at 90° C. were performed. A case where an unsealed portion occurred at the time of filling was regarded as defective. Regarding a bag that could be sealed, a case where a static load of 100 kg was applied for 1 minute, and bursting occurred was regarded as defective. Regarding hot filling, a case where fusion of seal faces together occurred during filling was regarded as defective without performing a pressure test.

Example A1

After coating a base layer with an anchor coating agent, a resin of an intermediate layer was extruded as a first thermoplastic resin layer from first extrusion and a resin of a sealing layer was extruded as a second thermoplastic resin layer from second extrusion by continuous processing, using a tandem extruder. An oriented nylon film having a thickness of 15 μm was used as the base layer. As the anchor coating agent, a commercially available general urethane resin anchor coating agent was applied such that the coating thickness after drying was 0.7 μm. For the resin of the intermediate layer, a resin in which LLDPE having a density of 0.91 g/cm$^3$ and LDPE having a density of 0.92 g/cm$^3$ were mixed at a weight ratio of 8:2 to adjust an average density to 0.912 g/cm$^3$ was used and extruded at a thickness of 25 μm. For the resin of the sealing layer, a resin in which LLDPE having a density of 0.90 g/cm$^3$ and LDPE having a density of 0.92 g/cm$^3$ were mixed at a weight ratio of 8:2 to adjust an average density to 0.904 g/cm$^3$ and 400 ppm of erucic acid amide was added as a lubricant, was used and extruded at a thickness of 25 μm.

Example A2

Packaging was prepared with the same configuration as in Example A1, except that as the resin of the sealing layer, a resin in which 400 ppm of erucic acid amide was added to LLDPE having a density of 0.90 g/cm$^3$ was used.

Example A3

Packaging was prepared with the same configuration as in Example A1, except that a silica deposited biaxially oriented nylon film GL-EY (manufactured by Toppan Printing Co., Ltd.) having a nylon film having a thickness of 15 μm and a silica deposited film as a barrier layer is used as the base layer and the first thermoplastic resin layer was disposed so as to be laminated on the harrier layer.

Comparative Example A1

Packaging was prepared with the same configuration as in Example A1, except that as the resin of the sealing layer, a resin (a resin to Which the lubricant was not added) in which LLDPE having a density of 0.90 g/cm$^3$ and LDPE having a density of 0.92 g/cm$^3$ were mixed at a weight ratio of 8:2 was used.

Comparative Example A2

Packaging was prepared in a manner that a resin in which 400 ppm of erucic acid amide was added to LLDPE having a density of 0.89 g/cm$^3$ was used as a resin of the sealing layer without providing the intermediate layer and the resin of the sealing layer was extruded at a thickness of 50 μm to the base layer coated with the same anchor coating agent as in Example A1.

Comparative Example A3

Packaging was prepared in a manner that a resin in which 400 ppm of erucic acid amide was added to LLDPE having a density of 0.92 g/cm$^3$ was used as a resin of the sealing layer without providing the intermediate layer and the resin of the sealing layer was extruded at a thickness of 50 μm to the base layer coated with the same anchor coating agent as in Example A1.

Evaluation results such as high speed filling property and hot filling property are summarized in Table 1. In addition, evaluation results of gas barrier properties are summarized in Table 2.

In the evaluation result of Table 1, in a case where the result was "good", it was indicated as "A".

In addition, in the evaluation result of Table 1, in a case where the result was "defective", it was indicated as "B".

TABLE 1

| | | | Example A1 | Example A2 | Example A3 | Comparative Example A1 | Comparative Example A2 | Comparative Example A3 |
|---|---|---|---|---|---|---|---|---|
| Neck-in (mm) | | | 20 | 100 | 20 | 20 | 120 | 90 |
| Dynamic friction coefficient | | | 0.2 | 0.3 | 0.2 | 0.9 | 0.4 | 0.3 |
| Exterior view | | | A | A | A | B | A | A |
| | | | | | | Meandering gap | | |
| Room temperature filling 25° C. | Conveying speed 10 m/min | Seal temperature 120° C. | A | A | A | A | A | A |
| | | 150° C. | A | A | A | A | A | A |
| | | 180° C. | A | A | A | A | A | A |
| | Conveying speed 20 m/min | 120° C. | A | A | A | A | A | B |
| | | 150° C. | A | A | A | A | A | B |
| | | 180° C. | A | A | A | A | A | B |
| Hot filling 90° C. | Conveying speed 10 m/min | 120° C. | A | A | A | A | B | A |
| | | 150° C. | A | A | A | A | B | A |
| | | 180° C. | A | A | A | A | B | A |
| | Conveying speed 20 m/min | 120° C. | A | A | A | A | B | B |
| | | 150° C. | A | A | A | A | B | B |
| | | 180° C. | A | A | A | A | B | B |

TABLE 2

| | Oxygen barrier [cc/m² · day · atm] | Water vapor barrier [cc/m² · day · atm] |
|---|---|---|
| Example A1 | 40.0 | 10.0 |
| Example A3 | 0.5 | 4.0 |

In Example A1, as a result of adding 20% LDPE to the sealing layer, there were preferable results that the neck-in was small and the extrusion processing suitability was good while maintaining the high-speed filling property. In Example A2, the neck-in was somewhat large, but filling could be performed with both lubricity and high speed filling property without problems. In addition, in Example A3, a film having a barrier property was used as the base layer. Accordingly, it was equivalent to Example A1 with both high speed filling property and extrusion processing suitability. Also, the barrier property against the oxygen and water vapor greatly improved.

On the other hand, in Comparative Example A1, since the resins of the intermediate layer and the sealing layer were made equivalent to those of Example A1, the seal itself could be performed without any trouble in both room temperature filling and hot filling and even in high-speed filling. However, since the lubricant was not added, meandering occurred during conveyance and the sealing position shift occurred. In addition, in Comparative Example A2, since there was no intermediate layer, the resin of the sealing layer flowed in hot tilling and fusion of the sealing layers together occurred. Therefore, the filling could not be performed. In addition, in Comparative Example A3, there was no problem in room temperature filling and hot filling at low speed. However, since the density of the resin of the sealing layer was as high as 0.92 g/cm³, sealing failure occurred when the conveying speed was increased to 20 m/min, and high speed filling was not possible.

Example B1

As shown in the schematic sectional view of FIG. 2, the ceramic deposition film 215 was obtained by using the oriented nylon film having a thickness of 15 μm as the base layer 210 and depositing the aluminum oxide on one side of the base layer. In addition, a resin in which 10 parts by weight of urethane resin and 2 parts by weight of vinyl chloride-vinyl acetate copolymer resin were mixed was dissolved in mixed solvent of methyl ethyl ketone-isopropyl alcohol-ethyl acetate to obtain a transparent ink. Next, this transparent ink was applied to the deposition layer 212 by a gravure method to obtain the transparent ink layer 220 having a thickness of 0.5 μm.

Next, a commercially available general urethane resin anchor coating agent was applied as the adhesive layer 230 to the surface of the transparent ink layer 220, by an in-line coater of an extruder. The adhesive layer was applied such that the coating thickness after drying was 0.7 μm. A resin of the intermediate layer was extruded as a first thermoplastic resin layer from first extrusion and a resin of the sealing layer was extruded as a second thermoplastic resin layer from second extrusion by continuous processing, on the coated, using a tandem extruder. An oriented nylon film having a thickness of 15 μm was used as the base layer. For the resin of the intermediate layer, a resin in which linear low-density polyethylene (LLDPE) having a density of 0.91 g/cm³ and low-density polyethylene (LDPE) having a density of 0.92 g/cm³ were mixed at a weight ratio of 8:2 adjust an average density to 0.912 g/cm³, was used and extruded at a thickness of 25 μm. For the resin of the sealing layer, a resin in which LLDPE having a density of 0.90 g/cm³ and LDPE having a density of 0.92 g/cm³ were mixed at a weight ratio of 8:2 to adjust an average density to 0.904 g/cm³ and 400 ppm of erucic acid amide was added as a lubricant, was used and extruded at a thickness of 25 μm. Therefore, the sealant layer 240 including the first thermoplastic resin layer and the second thermoplastic resin layer was provided to obtain the barrier packaging 21.

Example B2

A barrier packaging material 21 was obtained in the same manner as in Example B1 except that a resin in which 10 parts of urethane resin and 2 parts of vinyl chloride-vinyl acetate copolymer resin were mixed was dissolved in a mixed solvent of methyl ethyl ketone-isopropyl alcohol-ethyl acetate and a transparent ink in which precipitated barium sulfate was dispersed as a transparent pigment at a weight ratio of 15%, was used as the transparent ink layer 20.

Example B3

The barrier packaging 21 was obtained in the same manner as in Example B2 except that the deposition layer 212 was made of silicon oxide.

Example B4

The barrier packaging 2100 was obtained in the same manner as in Example B3, except that an anchor coat layer (211 shown in FIG. 3) having the following composition was provided on the base layer 210, and a coating layer (213 shown in FIG. 3) having the following composition was provided on the deposition layer 212 to form the ceramic deposition film 225.

(Component of Anchor Coat Layer): In a diluent solvent, acrylic polyol was mixed with 2-(epoxy cyclohexane)ethyltrimethylsilane (hereinafter referred to as EETMS) so as to have an amount of 2.5 times (weight ratio) the EETMS. Further, a tin chloride-methanol solution (adjusted to 0.003 mol/g) was added thereto so as to be in an amount of 1/135 mol with respect to the EETMS. Then, tolylene diisocyanate was mixed such that the amount of NCO groups was equal to OH groups of the acrylic polyol. In this manner, the coating liquid for the anchor coat layer was prepared.

(Component of Coating Layer): 89.6 g (0.1 N) of hydrochloric acid was added to 10.4 g of tetraethoxysilane and the mixture was stirred for 30 minutes, and a hydrolyzed solution having a solid content of 3% by weight (in terms of $SiO_2$) and a polyvinyl alcohol solution were mixed to prepare a coating liquid for the coating layer.

Example B5

The packaging 2100 was obtained in the same manner as in Example B4, except that silica was dispersed as a transparent pigment in a weight ratio of 3% by weight.

Example B6

The packaging 2100 was obtained in the same manner as in Example B4, except that calcium carbonate was dispersed as a transparent pigment in a weight ratio of 15% by weight.

Example C1

Packaging was obtained in the same manner as in Example B4 except that the adhesive layer 230 was directly applied on the coating layer 213 without providing the transparent ink layer 220.

Example C2

The packaging 2100 was obtained in the same manner as in Example B4, except that, 10 parts by weight of urethane resin and 2 parts by weight of vinyl chloride-vinyl acetate copolymer resin were mixed, and an ink prepared by dissolving a resin in which precipitated barium sulfate is dispersed at a weight ratio of 30% with a mixed solvent of methyl ethyl ketone-isopropyl alcohol-ethyl acetate is used.

Example C3

The packaging 2100 was obtained in the same manner as in Example B4 except that a resin in which 2 parts of urethane resin and 10 parts of vinyl chloride-vinyl acetate copolymer resin were mixed was dissolved in a mixed solvent of methyl ethyl ketone-isopropyl alcohol-ethyl acetate, and a transparent ink obtained by dispersing the precipitated barium sulfate as a transparent pigment at a weight ratio of 15% by weight was used.

(Evaluation of Adhesion Strength and Evaluation of Tearability)

A packaging bag with a four-sided seal with an inner size of 100 mm×100 mm was obtained by heat sealing using the packagings 21 and 2100 obtained in Examples B1 to B6 and Examples C1 to C3. In this case, test samples were obtained by filling the packaging bag with water, noodles, miso, and mustard, as a content.

The adhesion strength between the ceramic deposition films 215 and 225 and the sealant layer 240 and the tearability of the packaging bag were evaluated as evaluation items of the test samples.

[Adhesion Strength]: The packaging after removing the content from the packaging bag was cut into strips with a width of 15 mm, and the strength when peeling off the sealant layer 240 from the ceramic deposition films 215 and 225 at a test speed of 300 mm/min, that is, the adhesion strength (unit: N/15 mm) was measured.

[Tearability]: The tear strength was measured by a Trouser method described in JIS K-7128. In addition, tearing was substantially manually performed from the sealing part of the packaging bag. A case where the tear strength was 0.5 N or less and when it was manually torn, the sealant layer tore without being stretched was regarded as A. A case where the tear strength was 0.5 N or more but when it was manually torn, it tore without being stretched was regarded as B. A case where, when it was manually torn, it was stretched and hard to split, was regarded as C.

The results obtained by performing the evaluations at 20° C. under 30% atmosphere, after 1 day of storage from the filling with content and at 40° C. under 70% atmosphere, after 7 days of storage were summarized in Table 3.

TABLE 3

| | | Water | | Noodle soup | | Miso | | Mustard | |
|---|---|---|---|---|---|---|---|---|---|
| | | Adhesion strength | Tearing | Adhesion strength | Tearing | Adhesion strength | Tearing | Adhesion strength | Tearing |
| Example B1 | 20° C., 30%, after 1 day | 7.5 | A | 7.6 | A | 7.2 | A | 6.8 | A |
| | 40° C., 70%, after 7 days | 6.2 | B | 5.1 | B | 3.8 | B | 3.5 | B |
| Example B2 | 20° C., 30%, after 1 day | 7.1 | A | 7.5 | A | 7.2 | A | 6.6 | A |
| | 40° C., 70%, after 7 days | 6.5 | A | 5.9 | A | 3.3 | A | 3.3 | A |
| Example B3 | 20° C., 30%, after 1 day | 7.0 | A | 7.2 | A | 7.0 | A | 6.7 | A |
| | 40° C., 70%, after 7 days | 6.5 | A | 5.7 | A | 3.5 | A | 3.4 | A |
| Example B4 | 20° C., 30%, after 1 day | 6.5 | A | 6.3 | A | 6.2 | A | 6.1 | A |
| | 40° C., 70%, after 7 days | 5.5 | A | 5.1 | A | 3.2 | A | 3.0 | A |
| Example B5 | 20° C., 30%, after 1 day | 6.8 | A | 6.5 | A | 6.7 | A | 6.5 | A |
| | 40° C., 70%, after 7 days | 5.2 | A | 5.2 | A | 3.0 | B | 3.0 | B |
| Example B6 | 20° C., 30%, after 1 day | 6.2 | A | 6.3 | A | 6.3 | A | 6.2 | A |
| | 40° C., 70%, after 7 days | 5.5 | A | 4.8 | A | 3.1 | B | 3.2 | B |
| Example C1 | 20° C., 30%, after 1 day | 2.0 | C | 1.8 | C | 1.7 | C | 1.6 | C |
| | 40° C., 70%, after 7 days | 0.8 | C | 0.7 | C | 0.5 | C | 0.5 | C |
| Example C2 | 20° C., 30%, after 1 day | 6.0 | B | 6.1 | B | 5.2 | B | 5.0 | B |
| | 40° C., 70%, after 7 days | 5.8 | B | 4.1 | B | 2.2 | C | 2.0 | C |
| Example C3 | 20° C., 30%, after 1 day | 3.5 | B | 3.2 | B | 2.8 | B | 2.5 | B |
| | 40° C., 70%, after 7 days | 1.8 | C | 0.9 | C | 0.7 | C | 0.6 | C |

(Unit of adhesion strength: N/15 mm)

From the above Table 3, as shown in Examples B1 to B6, when a transparent ink layer formed of a mixture of urethane resin and a blend resin of vinyl chloride resin was provided between the deposition layer 212 and the sealant layer 240, barrier packaging (a barrier packaging bag) which can prevent adhesion strength from deteriorating irrespective of a content and maintain good tearability was obtained. Further, when the transparent pigment was added to the transparent ink layer, barrier packaging (a barrier packaging bag) having further improved tearability was obtained.

On the contrary, in Example C1 in which the transparent ink layer was not provided, compared to Examples B1 to B6, as a result, the adhesion strength was weak from an initial stage and the tearability was also decreased.

In addition, compared to Example B4, in Example C2 in which the transparent pigment was excessively added to the transparent ink layer, as a result, the adhesion strength was low and the tearability was deteriorated When the adhesion strength further decreased due to the storage test.

In addition, in Example C3 in which the ratio of vinyl chloride-vinyl acetate copolymer resin in the binder resin was high, although it is possible to tear even when the hardness of the ink layer was high so that the adhesion was low to some extent, compared to Examples B1 to B6, the adhesion strength tends to decrease due to the storage test, resulting in a decrease in tearability.

From the viewpoint of preventing the adhesion strength from decreasing irrespective of a content and maintaining good tearability, more preferable results were obtained in barrier packaging of Examples B1 to B6 than packaging of Examples C1 to C3.

In the above embodiments, an example in which the erucic acid amide which is a fatty acid amide lubricant is added to the second thermoplastic resin layer is shown. However, the second thermoplastic resin layer may contain only the fatty acid ester lubricant, and the second thermoplastic resin layer may contain both the fatty acid amide lubricant and the fatty acid ester lubricant.

In the above embodiment, an example in which a polyolefin resin is used for both the first thermoplastic resin layer and the second thermoplastic resin layer is shown. However, the polyolefin resin may be used for only one of the first thermoplastic resin layer and the second thermoplastic resin.

In the above embodiments, both the first thermoplastic resin layer and the second thermoplastic resin layer are configured to include the linear low-density polyethylene. However, only one of the first thermoplastic resin layer and the second thermoplastic resin layer may be configured to include the linear low-density polyethylene.

In the above embodiments, an example in which a mixture of the linear low-density polyethylene and the low-density polyethylene is used for both the first thermoplastic resin layer and the second thermoplastic resin layer is shown. However, only one of the first thermoplastic resin layer and the second thermoplastic resin layer may be configured to include a mixture of the linear low-density polyethylene and the low-density polyethylene.

In the above embodiments, the barrier layer has the barrier property against both the water vapor and the gas. However, the barrier layer may be configured to have a barrier property against only one of the water vapor and the gas.

In the above embodiments, an example in which one of precipitated barium sulfate, calcium carbonate, and silica is added as a transparent pigment to the transparent ink layer is shown. However, as a transparent pigment, two of precipitated barium sulfate, calcium carbonate, and silica may be used in combination for the transparent ink layer, and all three of precipitated barium sulfate, calcium carbonate, and silica may be used in combination as a transparent pigment in the transparent ink layer.

Although the embodiments of the present invention have been described above, the respective configurations in the embodiments, combinations thereof, and the like are merely examples, and additions, omissions, substitutions of constituents, and other modifications are possible within a range not departing from the scope of the present invention. In addition, the present invention is not limited by the embodiments.

REFERENCE SIGNS LIST

11: Packaging (Packaging for liquid packaging)
110: Base layer
111: First thermoplastic resin layer
112: Second thermoplastic resin layer
21, 2100, 2200: Packaging (Barrier packaging, Barrier packaging material)
210: Base layer (Base film)
211: Anchor coat layer
212: Deposition layer of inorganic oxide (Barrier layer, First barrier layer)
213: Coating layer (Barrier layer, Second barrier layer)
215, 225: Ceramic deposition film
220: Transparent ink layer
230: Adhesive layer
240: Sealant layer
250: Colored ink layer

The invention claimed is:

1. A packaging comprising:
a base layer including at least one layer of a biaxially oriented resin film; and
a sealant layer including at least a first thermoplastic resin layer and a second thermoplastic resin layer, wherein
the base layer, the first thermoplastic resin layer, and the second thermoplastic resin layer are laminated in an order of the base layer, the first thermoplastic resin layer, and the second thermoplastic resin layer,
a density of a first thermoplastic resin forming the first thermoplastic resin layer is higher than a density of a second thermoplastic resin forming the second thermoplastic resin layer,
the density of the first thermoplastic resin is 0.90 g/cm$^3$ or higher,
the density of the second thermoplastic resin is 0.92 g/cm$^3$ or lower,
the first thermoplastic resin layer consists of a mixture of at least one linear low-density polyethylene and low-density polyethylene, and
the second thermoplastic resin layer contains 200 to 2000 ppm of a lubricant including at least one of a fatty acid amide lubricant or a fatty acid ester lubricant.

2. The packaging according to claim 1, wherein a blending ratio of the low-density polyethylene to the linear low-density polyethylene is 40% or less in terms of weight ratio.

3. The packaging according to claim 1, wherein the base layer is provided with a barrier layer against at least one of water vapor and gas.

4. The packaging according to claim 3, wherein the barrier layer includes a deposition layer formed of at least an inorganic oxide,
a transparent ink layer is provided on the barrier layer,
an adhesive layer is provided on the transparent ink layer,
a sealant layer is provided on the adhesive layer, and
the transparent ink layer is formed of a transparent ink containing a binder resin formed of a mixture of a urethane resin and a vinyl chloride-vinyl acetate copolymer resin,
wherein a transparent pigment is dispersed in the binder resin.

5. The packaging according to claim 4,
wherein the barrier layer includes a deposition layer formed of at least an inorganic oxide,
a transparent ink layer is provided on the barrier layer,
an adhesive layer is provided on the transparent ink layer,
a sealant layer is provided on the adhesive layer, and
the transparent ink layer is formed of a transparent ink containing a binder resin formed of a mixture of a urethane resin and a vinyl chloride-vinyl acetate copolymer resin.

6. The packaging according to claim 5, wherein a transparent pigment is dispersed in the binder resin.

7. The packaging according to claim 5, wherein, a mixing ratio in the binder resin is set such that the vinyl chloride-vinyl acetate copolymer resin is 1 part by weight to 5 parts by weight with respect to 10 parts by weight of the urethane resin.

8. The packaging according to claim 5, wherein a colored ink layer is provided at least in a part between the deposition layer and the transparent ink layer.

9. The packaging according to claim 3,
wherein the barrier layer includes a deposition layer formed of at least an inorganic oxide,
a transparent ink layer is provided on the barrier layer,
an adhesive layer is provided on the transparent ink layer,
a sealant layer is provided on the adhesive layer, and
the transparent ink layer is formed of a transparent ink containing a binder resin formed of a mixture of a urethane resin and a vinyl chloride-vinyl acetate copolymer resin.

10. The packaging according to claim 9, wherein a transparent pigment is dispersed in the binder resin.

11. The packaging according to claim 9, wherein, a mixing ratio in the binder resin is set such that the vinyl chloride-vinyl acetate copolymer resin is 1 part by weight to 5 parts by weight with respect to 10 parts by weight of the urethane resin.

12. The packaging according to claim 9, wherein a colored ink layer is provided at least in a part between the deposition layer and the transparent ink layer.

13. A packaging bag comprising the packaging according to claim 1.

14. A packaging bag comprising the packaging according to claim 2.

15. A packaging bag comprising the packaging according to claim 3.

16. A packaging bag comprising the packaging according to claim 4.

17. A packaging bag comprising the packaging according to claim 9.

18. A packaging bag comprising the packaging according to claim 5.

* * * * *

UNITED STATES PATENT AND TRADEMARK OFFICE
CERTIFICATE OF CORRECTION

PATENT NO. : 11,208,245 B2
APPLICATION NO. : 16/423948
DATED : December 28, 2021
INVENTOR(S) : Shigeki Kudo et al.

It is certified that error appears in the above-identified patent and that said Letters Patent is hereby corrected as shown below:

On the Title Page

Column 2, Line 5, in the Abstract (57), delete "laser," and insert --layer,--.

Column 2, Line 13, in the Abstract (57), delete "fatly" and insert --fatty--.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*